Oct. 21, 1969    K. FRITZ    3,473,330
MASTER CYLINDER FOR BRAKE SYSTEMS AND THE LIKE
Filed Oct. 31, 1967    2 Sheets-Sheet 1

Karl Fritz
INVENTOR.

BY
Karl G. Ross
Attorney

Oct. 21, 1969  K. FRITZ  3,473,330
MASTER CYLINDER FOR BRAKE SYSTEMS AND THE LIKE
Filed Oct. 31, 1967  2 Sheets-Sheet 2

Karl Fritz
INVENTOR.

BY  Karl G. Ross
Attorney

United States Patent Office 3,473,330
Patented Oct. 21, 1969

3,473,330
MASTER CYLINDER FOR BRAKE SYSTEMS AND THE LIKE
Karl Fritz, Morfelden, Germany, assignor to Alfred Teves GmbH, Frankfurt am Main, Germany, a corporation of Germany
Filed Oct. 31, 1967, Ser. No. 679,417
Claims priority, application Germany, Nov. 5, 1966,
T 32,452
Int. Cl. F15b 7/08
U.S. Cl. 60—54.6                7 Claims

ABSTRACT OF THE DISCLOSURE

A master or fluid-transmitting cylinder for use in vehicular-brake systems, fluid-operated servomechanisms and the like in which the cylinder wall is provided with an axially extending recess in the region of the reservoir port whose flanks rise with shallow slope toward the deep portion of the recess and the piston has a sealing collar slidably engaging the wall of the cylinder and rising just behind the forward end of the recess in the rest or nonshifted position of the piston.

---

My present invention relates to a piston-and-cylinder arrangement for the delivery of hydraulic fluid from an equalizing reservoir to a load and, more particularly, to a master cylinder for vehicular-brake systems and/or a control or operating cylinder of a servomechanism or any other remotely disposed load.

The use of fluid networks comprising a master or control cylinder whose piston is shiftable by a primary force to operate remotely disposed receiving or follower cylinders or fluid-responsive devices has become commonplace in numerous fields. In vehicular brake systems, for example, a master cylinder is surmounted by a fluid reservoir which communicates with the master-cylinder bore via a pair of ports spaced in the direction of movement of the cylinder, one of these ports being termed generally an intake port and is disposed behind the other or bypass port. The piston may be provided with a collar or seal of cup-shaped configuration at its forward end (in the direction of advance of the piston for displacing fluid from the cylinder), which cup slidably engages the wall of the cylinder and advances upon depression of the brake pedal to block the bypass or equalizing port and thereafter displace the fluid confined in the master cylinder without the possibility of returning to the reservoir. Master cylinders of this character may have one or more chambers as, for example, in twin or tandem cylinders, the chambers of which deliver brake fluid to individual transmission networks and, in turn, to individual sets of wheel brakes. In the case of a brake system, the wheel brake cylinders form the receiving or follower cylinders located remote from the master cylinder. In other fluid systems, the master cylinder may form a force or motion transmitter whose displacement is communicated to one or more follower or receiving cylinders coupled with the transmitting selector by a fluid-transmission network. Thus, when reference is made hereinafter to a master cylinder, it is to be understood that the cylinder can be a force or motion-transmitting unit for servomechanisms, remotely operated devices or the like, and that the master cylinder may be operated by any conventional actuator although a pedal is of primary interest for a brake system.

As previously indicated, the piston of a master cylinder of this character is provided with a primary cup or collar-type seal which, during the forward stroke of the piston, closes off communication between the equalizing surfaces and the working chamber of the cylinder in which the piston is confined. Liquid equalization in the sense of the present invention occurs during the return stroke of the piston when the fluid behind the piston, supplied to the rearward chamber by the intake port of the fluid reservoir, passes the collar or primary cup during the return stroke in such manner that the primary cup acts as a check valve permitting filling of the chamber ahead of the piston during its return stroke. The piston configurations and tolerances required for operation in this fashion are relatively complex and of expensive manufacture, while additional difficulties are created because of the two ports leading from the equalizing reservoir to the cylinder chamber. Furthermore, when a pair of ports are provided in the manner previously described, difficulties are encountered with the bypass port disposed ahead of the sealing cup because there is a tendency, as pressure builds up within the cylinder, for the elastomeric seal to be forced into the bypass port, thereby increasing the tendency to tearing and the mechanical wear of the cup, leading eventually to deterioration and failure.

It is the principal object of the present invention to provide a simplified master-cylinder constructure particularly adapted for use in vehicular-brake systems wherein the manufacturing cost can be reduced and deterioration of the moving parts substantially limited.

A further object of this invention is to provide a simplified master cylinder for the operation of remote fluid-responsive loads, e.g. wheel-brake cylinders of a vehicular brake system. I have now found that the aforedescribed disadvantages can be eliminated and a master cylinder of simplified construction and long life provided when the bypass port hitherto located ahead of the primary cup or sealing collar of the piston is eliminated and the wall of the cylinder bore, in the region of the intake port connecting the reservoir with the master cylinder behind the primary cup, is formed with an axially extending recess having shallow flanks and reaching just ahead of the primary cup in the rest position of the piston. The other end of the elongated recess extends to the intake port and, therefore, behind the primary cup in the rest position of the piston and communicates with the interior of the cylinder, with the reservoir and the intake port in this chamber behind the primary cup. Advantageously, the recess can terminate at the intake port. It has been found that the shallow flanks of the recess prevent deterioration of the primary cup even though the pressure builds up ahead of the piston to urge the lip of the cup radially outwardly with considerable force. Furthermore, the recess functions as a bypass port in the sense that it is readily closed off by advance of the piston. Pressure equalization in the cylinder is effected via the intake port and the recesses during release of the brake pedal and relief of the fluid system since any part of the lip of the primary cup which has been forced into the shallow flank recess is withdrawn by the inherent elasticity of the cup to interconnect the forward and rearward chambers with one another and with the reservoir.

The above and other objects, features and advantages of the present invention will become more readily apparent from the following description, reference being made to the accompanying drawing in which.

Figure 1:
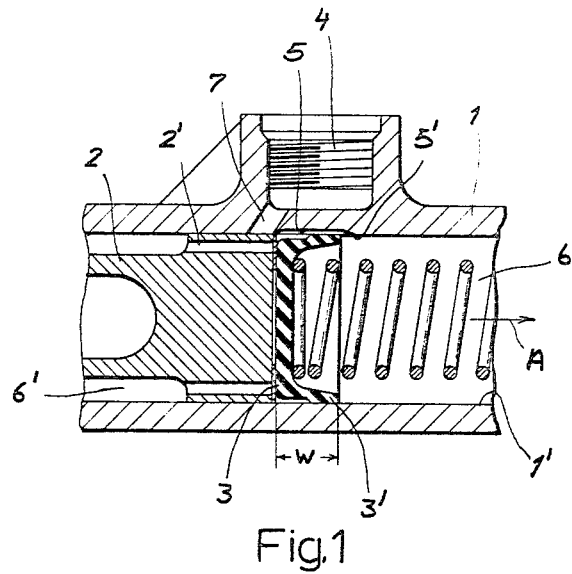
FIG. 1 is an axial cross-sectional view of part of a master cylinder embodying the present invention.

From FIGS. 1–3, it can be seen that the master cylinder 1 has a cylindrical inner bore 1' within which a piston 2 is axially shiftable from a rest position, as illustrated, in the direction of arrow A to drive brake fluid to a fluid-transmission network and the wheel brakes of an automotive vehicle as described hereinafter in connection with FIG. 4. At its forward end, the piston 2 carries a primary cup 3 whose lip 3' slidably engages the wall 1' of the cylinder bore and is of circular configuration. As the piston 2 is driven to the right (FIG. 1), the pressure build-up in the chamber 6 ahead of the piston urges the lip 3' radially outwardly. An internally threaded boss 4 received an equalizing or supply reservoir (not shown) and is connected via an intake port 7 with the chamber 6' behind the primary cup 3 while axial channels 2' are formed in the piston 2 in the usual manner. According to the principles of this invention, an elongated or flute-like recess 5 (FIGS. 2 and 3) rises with shallow incline from the cylindrical wall 1' of the cylinder bore and extends axially, i.e. in the direction A of displacement of the piston 2, from the intake port 7 to a region 5' just ahead of the primary cup 3' in the inactive or rest position of the piston 2.

Figure 2:
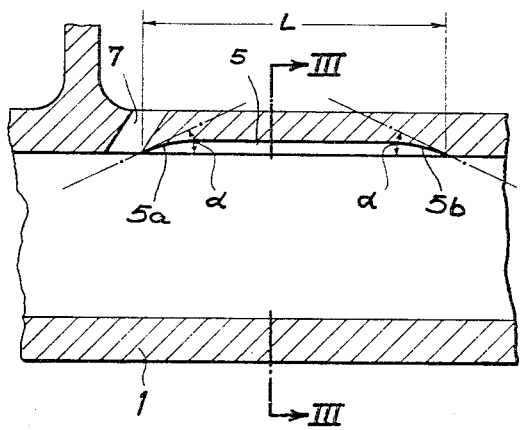
FIG. 2 is a cross-sectional view drawn to an enlarged scale of the region of the recess of the cylinder of FIG. 1.
Figure 3:
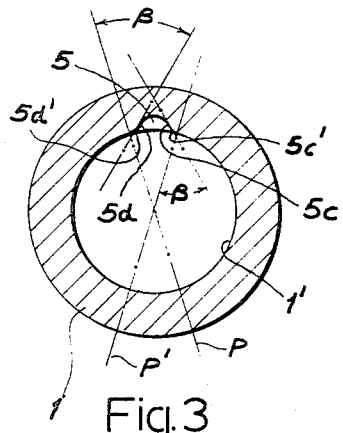
FIG. 3 is a cross-sectional view, taken along the line III—III of FIG. 2.

The recess 5 has a depth of the order of several millimeters to, say 1 cm. and an axial length L exceeding the axial width W of the primary cup 3 and is provided with shallow end flanks 5a and 5b whose inclination to the imaginary cylindrical surface corresponding to the wall 1' is designated in FIG. 2 at α. The angle α, representing the inclination of the shallow flanks, may range from, say, 5° to 45°. Similarly, the lateral flanks 5c and 5d of the recess are inclined to respective radial planes P and P' of the cylinder which intersects the wall 1' at the mouth of the recess 5, at angles β ranging from, say, 5° to 75°.

As the piston 2 is shifted to the right (arrow A), the primary cup 3 blocks the recess 5 at its end 5b to force the fluid in chamber 6 to the wheel brakes. Even though the pressure within chamber 6 forces the cup 3 outwardly and at least partly into the recess 5, there is substantially no tearing of the cup because of the shallow flanks. Similarly, the back-and-forth movement of the piston produces no tearing of the cup. In addition, the lateral edges 5c' and 5d' as the recess 5 joins the wall 1' are provided with rounds are radiuses to limit tearing or cutting action. Upon release of the brake pedal, piston 2 is shifted to the left and a pressure drop is generated in chamber 6. Because of the inherent elasticity of the cup 3, the lip 3' is drawn inwardly to unblock the recess 5 and permit pressure and volume equalization between chamber 6, 6' and the reservoir.

Figure 4:
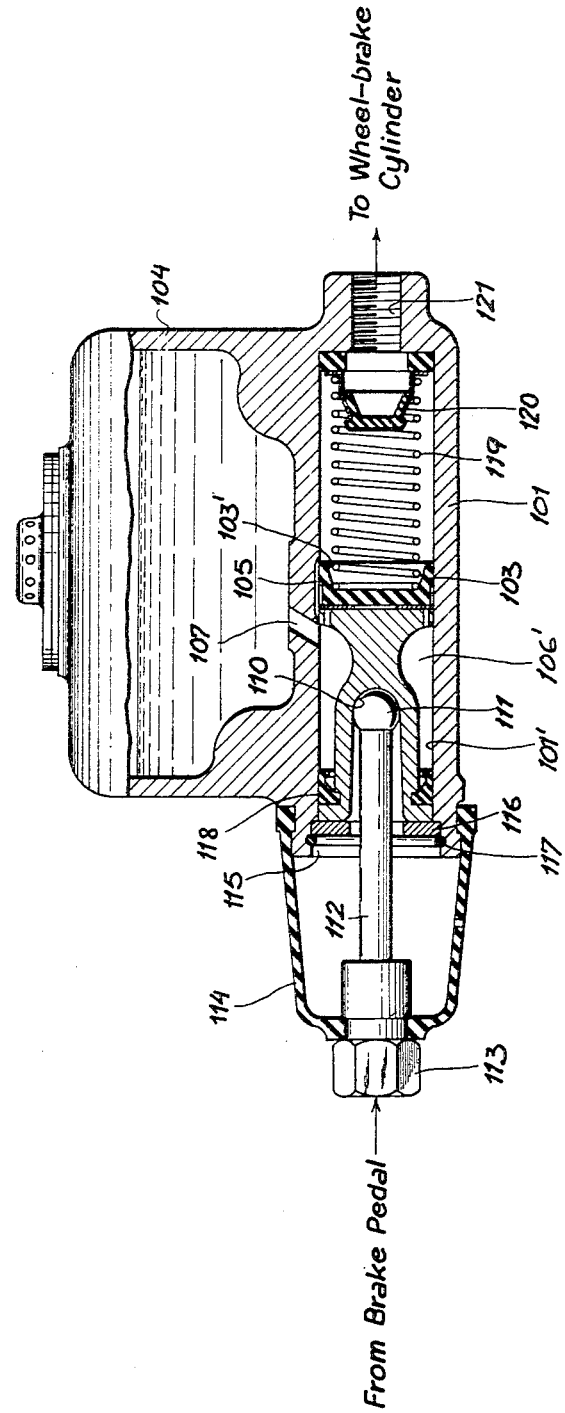
FIG. 4 is an overall view, in axial cross-section, of a vehicle brake-master cylinder embodying the present invention.

In FIG. 4, I show a brake-master cylinder in which the reservoir 104 is integral with the cylinder 101 whose cylindrical bore 101' slidably receives the piston 102. The latter is provided with a spherical socket 110 in which the ball-shaped head 111 of a link 112 is received. The link is connected at a fitting 113 with the brake pedal and engages a dust-excluding boot 114 which prevents the entry of contaminants into the brake cylinder through its open end 115. A stop ring 116 defines the rest position of the piston 102 and is, in turn, held in place by a retaining spring 117. As previously described, the reservoir 104 has an intake port 107 communicating with the annular chamber 106' surrounding the piston 102 behind the primary cup 103 whose lip 103' slidably engages the wall 101'. At the other end of the piston 102, there is provided the secondary cup 118. The primary cup, as in the case of the embodiment illustrated in FIGS. 1–3, may serve as a seat for a return spring 119 which cooperates with the usual check valve 120 at the outlet 121 which is connected with the wheel-brake cylinder by fluid-transmission lines. A shallow-flank and rounded edge recess 105, in all respects similar to the recess 5 of FIGS. 1–3, is provided for cooperation with the lip 103' as previously described. The system of FIG. 4, of course, functions in the manner previously set forth.

The invention described and illustrated is believed to admit of many modifications within the ability of persons skilled in the art.

I claim:

1. A master-cylinder assembly for dispensing a hydraulic fluid, comprising a cylinder body formed with an axially extending cylinder bore and an intake port opening into said bore at an intermediate location therealong for delivering hydraulic fluid to said bore, and a piston axially shiftable in said bore and provided with an annular seal slidably engaging the wall of said bore, said piston being displaceable from a rest position in one direction to expel fluid from said bore, said wall of said bore being provided with a flute-like recess extending parallel to the axis of said bore and terminating ahead of said seal in said rest position of said piston and communicating with said port while being axially aligned therewith whereby said piston blocks said recess upon advance in said one direction, said recess terminating at one end at said intake port and having flanks at opposite axial ends of the recess of relatively shallow incline permitting deflection of said seal into said recess under pressure without damage to the seal upon axial movement of said piston in said bore, said flanks including acute angles of less than about 45° with the wall of said bore, the circumferential width of said recess being a small fraction of its length.

2. The assembly defined in claim 1 wherein said recess has rounded lateral edges in the region in which it opens into said bore.

3. The assembly defined in claim 2 wherein said seal is an elastomeric cup having a resiliently deformable annular lip sealingly and slidably engaging the wall of said bore, the axial length of said recess exceeding the axial width of said cup.

4. The assembly defined in claim 3 wherein said bore is connectable ahead of said piston in said direction with a set of hydraulically operable wheel brakes.

5. The assembly defined in claim 4 wherein said cylinder body is surmounted by a reservoir for said fluid, said reservoir communicating with said intake port.

6. The assembly defined in claim 5 wherein said recess has lateral, longitudinally extending flanks each including, with a respective axial plane through said cylinder bore at the junction of said flanks with said wall, angles ranging between 5 and 75°.

7. The assembly defined in claim 6 wherein said flanks of said recess at its ends include with the wall of said bore angles ranging between 5 and 45°.

References Cited

UNITED STATES PATENTS

| 1,819,482 | 8/1931 | Pentz | 60—54.6 |
| 2,377,017 | 5/1945 | Lacoe | 60—54.6 |
| 2,561,009 | 7/1951 | Byers et al. | 60—54.6 |
| 3,156,097 | 11/1964 | Brown | 60—54.6 |
| 2,396,155 | 3/1946 | Christensen | 60—54.6 |

FOREIGN PATENTS

| 802,494 | 2/1951 | Germany. |
| 853,565 | 10/1952 | Germany. |

MARTIN P. SCHWADRON, Primary Examiner

ROBERT R. BUNEVICH, Assistant Examiner

U.S. Cl. X.R.

92—162, 169